United States Patent [19]

Ohmori

[11] Patent Number: 4,918,299
[45] Date of Patent: Apr. 17, 1990

[54] PLASTIC PACKAGE FOR CARD HAVING A BUILT-IN STORAGE MEDIUM

[75] Inventor: Makoto Ohmori, Itami, Japan

[73] Assignee: Mitsubishi Denki Kabushiki Kaisha, Japan

[21] Appl. No.: 151,983

[22] Filed: Feb. 3, 1988

[30] Foreign Application Priority Data

Sep. 7, 1987 [JP] Japan .................. 62-222058

[51] Int. Cl.⁴ .................................. G06K 19/02
[52] U.S. Cl. .................. 235/488; 150/147; 220/76; 206/449; 360/2
[58] Field of Search .......... 235/488, 492, 493; 360/132, 2; 150/146, 147; 220/76; 206/449

[56] References Cited

U.S. PATENT DOCUMENTS

| | | | |
|---|---|---|---|
| 3,593,913 | 7/1971 | Bremer | 235/493 X |
| 3,862,399 | 1/1975 | Cain | 235/493 X |
| 3,949,501 | 4/1976 | Andrews et al. | 235/493 X |
| 4,593,736 | 6/1986 | Morita | 150/147 |
| 4,700,840 | 10/1987 | Haddock | 206/449 |
| 4,711,347 | 12/1987 | Drexler et al. | 150/147 X |

FOREIGN PATENT DOCUMENTS 58-166744 10/1983 Japan .

Primary Examiner—David L. Trafton
Attorney, Agent, or Firm—Leydig, Voit & Mayer

[57] ABSTRACT

A plastic package for a card having a built-in storage medium is provided which comprises two plastic half case bodies having the same structure. Each of the half case bodies is provided with a convex portion and a concave portion which can engage with the corresponding concave portion and convex portion of the other half case body. The convex portion and the concave portion of each half case body are disposed symmetrically with respect to a reference line on each half case body. Therefore, the two half case bodies can be simply and precisely located and can be efficiently bonded by engagement between the convex and concave portions. In addition, since it is not necessary to charge and permeate an adhesive into joint portions from the peripheries thereof, the workability for jointing is good and no adhesive will be squeezed out from the joint portions to adversely affect the appearance of the joint portions.

5 Claims, 2 Drawing Sheets

PLASTIC PACKAGE FOR CARD HAVING A BUILT-IN STORAGE MEDIUM

BACKGROUND OF THE INVENTION

1. Field of the Invention

The present invention relates to a card having a built-in storage medium such as an IC or other semiconductor device which is used, for example, in a data storage medium of a computer, and more particularly, to a plastic package for encasing and protecting the body of a card with a built-in storage medium such as an IC or other semiconductor device.

2. Description of Prior Art

FIG. 5 shows a conventional plastic package for covering and protecting the body of a card which has a built-in storage medium such as an IC or other semiconductor device. Referring to the figure, the plastic package illustrated comprises two rectangular half case bodies 1 made of plastic and having U-shaped sections between which a lamellar card body (not shown) having a built-in storage medium is held. Joint surfaces 1a which project along the periphery of each half case body 1 are then placed against each other and are bonded by an adhesion means such as an adhesive.

As can be seen from FIG. 5, in this conventional plastic package used for a card having a built-in storage medium, the joint surfaces 1a of the two half case bodies 1 are flat and the two half case bodies 1 are bonded together by applying an adhesive to one or both of the joint surfaces 1a, or by charging and permeating an adhesive from the outside between the joint surfaces 1a when they are in close contact.

As described above, a conventional plastic package for a card having a built-in storage medium is formed by bonding two half case bodies 1. However, when an adhesive is applied to one or both of the joint surfaces 1a for bonding the half case bodies together, a sufficient amount of adhesive must be applied so that the two joint surfaces 1a can be virtually uniformly bonded together. However, there is a problem in that the adhesive will be squeezed out into the interior or the exterior of the joint surfaces 1a of the half case bodies 1, and thus the appearance of the package is likely to be impaired. In addition, since the adhesive must be uniformly applied to the entire joint surfaces, the operation is tedious and time-consuming.

If the joint surfaces 1a of the half case bodies 1 are first placed in close proximity with each other, and the adhesive is then charged and permeated between the joint surfaces 1a from the outside, there is a problem in that nonuniformity is likely to be produced in the permeation of the adhesive between the joint surfaces 1a, namely the adhesive will not disperse over the entire joint surfaces 1a, resulting in unevenness of the adhesive between the joint surfaces 1a, extended bonding times, and soiling by the adhesive of the peripheries in the bonding portions of the package.

In addition, the above-described two bonding methods have the following problems. Specifically, it is difficult to precisely locate the two joint surfaces 1a; the joint surfaces 1a can easily be displaced during the adhesion; and it is difficult to precisely coincide the joint surfaces 1a with each other so that the peripheries of the bonding portions are not made flush with each other, thus resulting in reduced workability.

SUMMARY OF THE INVENTION

The present invention is intended to overcome the above-described problems of the prior art.

An object of the present invention is to provide a plastic package for a card having a built-in storage medium which enables precise location of half case bodies in a very simple manner.

Another object of the present invention is to provide a plastic package for a card in which the joint surfaces of the half case bodies are easily and uniformly bonded with each other along the peripheries thereof so that the appearance thereof is not adversely affected.

A further object of the present invention is to provide a plastic package for a card which can be produced at a low cost.

According to the present invention, there is provided a plastic package for a card having a built-in storage medium such as a semiconductor device, the plastic package comprising two plastic half case bodies having the same shape and each being provided with a convex portion and a concave portion which are disposed symmetrically with respect to a reference line on each of the half case bodies. The convex portion and the concave portion of one of the half case bodies are engageable with the corresponding concave portion and convex portion of the other half case body.

The two half case bodies of the plastic package can thus be simply and precisely positioned and can be efficiently bonded by engagement between the convex and concave portions which are provided on the joint surface of one half case body, and the concave and convex portions which are provided on the joint surface of the other half case body. In addition, since it is not necessary to charge and permeate an adhesive into the joint portions from the outer peripheries thereof, the workability for jointing is good. Further, no adhesive will be squeezd out from the joint surfaces to the outside thereof so that the appearance of the peripheral surfaces at the joint portions of the plastic package is not affected adversely.

DESCRIPTION OF THE PREFERRED EMBODIMENTS

Embodiments of the present invention will be described below with reference to the accompanying drawings.

Figure 1:
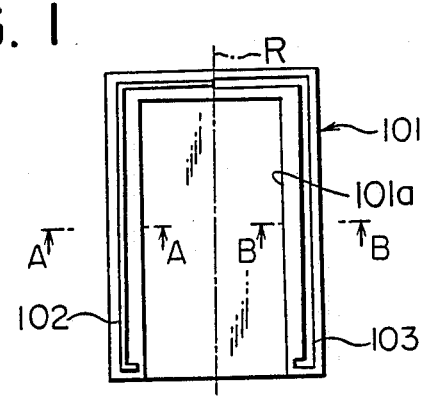
FIG. 1 is a plan view of a half case body which constitutes a part of a plastic package for a card having a built-in storage medium in accordance with an embodiment of the present invention.
Figures 2A, 2B:
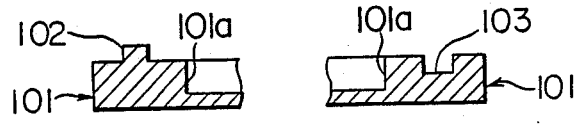
FIG. 2A is a sectional view taken along the line A—A of FIG. 1.
FIG. 2B is a sectional view taken along the line B—B of FIG. 1.
Figure 3:
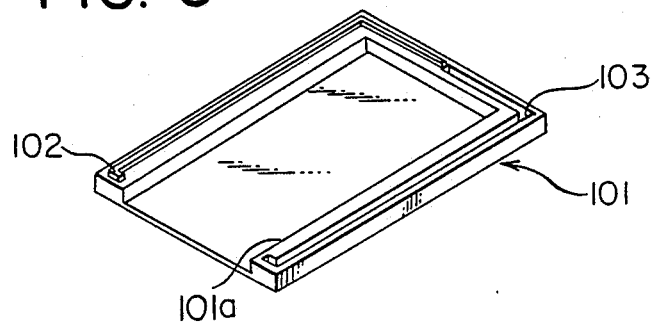
FIG. 3 is a perspective view of the half case body shown in FIG. 1.

FIGS. 1 to 3 show an embodiment of the plastic package for a card having a built-in storage medium according to the present invention. Referring to FIGS. 1-3, the package comprises two half case bodies 101 having the same structure (only one of the half case bodies is shown. Each of the half case bodies 101 has a rectangular recessed portion 101a for receiving a rectangular card body (not shown) having a built-in storage medium, a convex portion 102 in the form of a substantially L-shaped engagement projection which projects along the periphery on one side surface of a rectangular plastic plate, and a concave portion 103 in the form of a substantially L-shaped engagement groove 103 which is disposed symmetrically with the convex portion 102 with respect to a reference line R on the plastic plate, the engagement groove 103 being adapted to engage with the engagement projection 102 formed on the other half case body 101 not shown.

As can be seen from FIGS. 2A and 2B, the engagement projection 102 has a rectangular sectional shape, and the engagement groove 103 also has a rectangular sectional shape which corresponds to the engagement projection 102 and which is slightly wider than the width of the engagement projection 102 so that it can fit therein.

In addition, ends of the engagement projection 102 and the engagement groove 103, which are opposite to the ends where the engagement projection 102 and the engagement groove 103 are connected with each other, are disposed in a facing relationship with a gap therebetween, so that, when a card body (not shown) having a built-in storage medium such as a semiconductor memory is placed between the two half case bodies 101 which are then bonded together, an opening through which a connector for electrically connecting the card body to an external device is formed between those ends.

Each half case body 101 is generally formed by casting a plastic into a mold. Since each half case body 101 has the engagement projection 102 and the engagement groove 103 disposed symmetrically with respect to the reference line R, it is not necessary to prepare separate molds for producing a half case body having an engagement projection and a half case body having an engagement groove. Therefore, half case bodies 101 can be mass-produced using one single mold, and the production cost can thus be greatly reduced. In addition, due to the use of the same mold, it is easy to uniformly control production conditions so that the engagement projection 102 and the engagement groove 103 can be readily produced with high dimensional accuracy, resulting in a reduction in the defect ratio of the thus produced half case bodies 101.

A card having a built-in storage medium such as an IC card or a card with a built-in semiconductor device is assembled in accordance with the method described below.

An appropriate amount of an adhesive is applied to the engagement grooves 103 formed in one surface of each of the two half case bodies 101 which were formed by the above-described method. A card body (not shown) having a built-in storage medium, such as an IC or other semiconductor device, is then sandwiched between these half case bodies 101, and the engagement projection 102 and the engagement groove 102 formed in the surface of one half case body 101 are engaged with the corresponding engagement groove 103 and the engagement projection 102 of the other half case body 101, so that the engagement projections 102 are bonded with the engagement grooves 103 by the adhesive which was previously applied thereto. During this bonding, the adhesive applied to the engagement grooves 103 is slightly pushed out therefrom by the engagement projections 102 and is thus dispersed over the whole of each engagement projection 102. Since most of the adhesive remains in the engagement grooves 103, the peripheral surfaces of the joints are not soiled by the adhesive which squeezes out from the joint portions. In this way, a card having a built-in storage medium can be produced by bonding the two half case bodies 101 between which the card body is held.

In addition, when the adhesive is applied, an appropriate amount of the adhesive need only be applied to either the engagement groove 103 or the engagement projection 102 (usually to the engagement groove 103). It is, therefore, not necessary to uniformly apply the adhesive over the whole area of each joint surface, as in conventional cases, and thus the adhesive can be applied by a very simple operation in a short time.

It should be noted that it is also possible to make the engagement projections 102 engage closely with the engagement grooves 103 by making the width of each engagement groove 103 close to that of the corresponding engagement projections 102, whereby the two can be held together with no adhesive.

Figure 4:
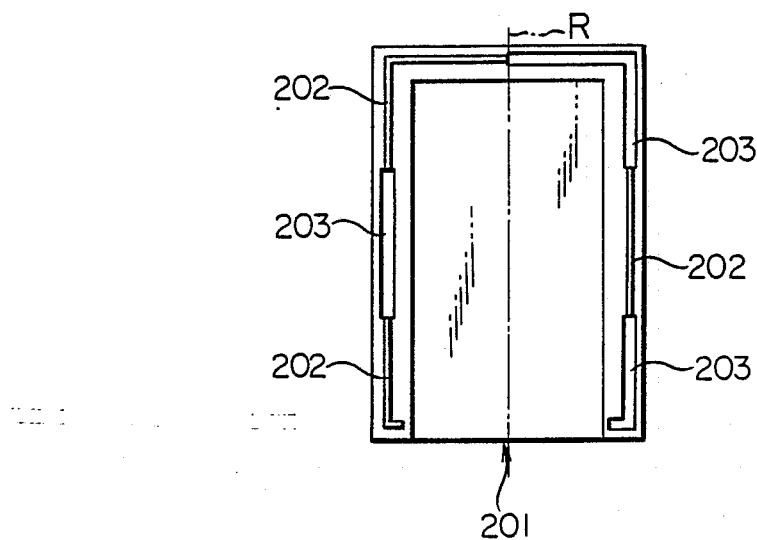
FIG. 4 is a plan view of a half case body according to another embodiment of the present invention.
Figure 5:
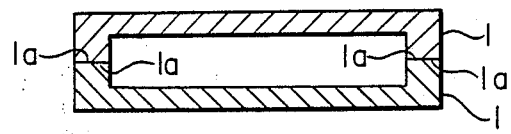
FIG. 5 is a sectional view of a conventional plastic package.

FIG. 4 is a plan view of another embodiment of the present invention. In this embodiment, a plurality of strips of engagement projections 202 and engagement grooves 203 are alternately disposed in sequence along the peripheral edges of one side surface of a half case body 201, in such a way that engagement projections 202 and the corresponding engagement grooves 203 are disposed symmetrically with respect to a reference line R. In this embodiment, therefore, two half case bodies 201 having the same shape can be integrally bonded to each other by engaging the engagement projections 202 and the engagement grooves 203 of one half case body 201 with the corresponding engagement grooves 203 and engagement projections 202 of the other half case body 201.

Although in the above-described embodiments, the engagement convex portions 102, 202 are formed as continuously extending projecting strips and the concave portions 103, 203 are also formed as continuously extending grooves, they are not limited to these forms; they may be formed as any kinds of projections and grooves of other shapes such as circles, triangles, rectangles, or polygons which are provided in the form of discontinuous shapes, or continuous waveforms. The concave portions may also comprise at least one groove and at least one depression, and the convex portions may comprise at least one projecting strip and at least one projection which can engage with the concave portions.

As described above, in the present invention, concave and convex portions which correspond to each other are provided in one side surface of each of half case bodies and are disposed symmetrically with respect to a reference line on each half case body. With this arrangement, a plastic package can be produced by two half case bodies of the same shape. Therefore, one type of mold is sufficient for producing the half case bodies, resulting in a considerable reduction in the production cost of the plastic package itself, an increase in the dimensional accuracy of the half case bodies and the concave and convex portions, and a decrease in the occurrence of defective products. In addition, during the bonding of the two half case bodies, they can be easily and precisely located by the engagement between the concave and the convex portions, and the relative positions of the two half case bodies which have been positioned in this way are not readily caused to displace, resulting in a great improvement in the working efficiency. Furthermore, when applying an adhesive to the joint portions of the half case bodies, the adhesive need not be applied to the whole joint surface of each joint portion, but may be applied to just the concave portions, for example, and this has the effect of facilitating the application of the adhesive.

What is claimed is:

1. A plastic package for a card having a built-in storage medium such as a semiconductor device, for encasing and protecting said card body, comprising two plastic half case bodies having the same shape and each being provided with a convex portion and a concave portion which are disposed symmetrically with respect to a reference line on each of said half case bodies, the convex portion and the concave portion of one of said half case bodies being engageable with the corresponding concave portion and convex portion of the other half case body, respectively.

2. A plastic package for a card having a built-in storage medium according to claim 1, wherein said concave and convex portions are alternately formed along the peripheral edges of each of said half case bodies.

3. A plastic package for a card having a built-in storage medium according to claim 2, wherein said concave portion comprises at least one groove, and said convex portion comprises at least one projecting strip which can engage with said groove of said other half case body.

4. A plastic package for a card having a built-in storage medium according to claim 2, wherein said concave portion comprises a plurality of depressions, and said convex portion comprises a plurality of projections which can engage with said depressions of said other half case body.

5. A plastic package for a card having a built-in storage medium according to claim 2, wherein said concave portion comprises at least one groove and at least one depression, and said convex portion comprises at least one groove and at least one projection which can engage with said groove and said depression of said other half card body.

* * * * *